United States Patent
Van Den Wouwer et al.

(10) Patent No.: US 9,786,325 B2
(45) Date of Patent: Oct. 10, 2017

(54) SYSTEM FOR VISUALIZING DATA

(71) Applicant: TELEVIC RAIL NV, Izegem (BE)

(72) Inventors: Dirk Van Den Wouwer, Melsele (BE); Wouter Vanhauwaert, Kuurne (BE)

(73) Assignee: TELEVIC RAIL NV, Izegem (BE)

( * ) Notice: Subject to any disclaimer, the term of this patent is extended or adjusted under 35 U.S.C. 154(b) by 77 days.

(21) Appl. No.: 14/771,006

(22) PCT Filed: Feb. 28, 2014

(86) PCT No.: PCT/EP2014/053969
§ 371 (c)(1),
(2) Date: Aug. 27, 2015

(87) PCT Pub. No.: WO2014/131893
PCT Pub. Date: Sep. 4, 2014

(65) Prior Publication Data
US 2016/0012852 A1     Jan. 14, 2016

(30) Foreign Application Priority Data
Feb. 28, 2013  (EP) ..................................... 13157138

(51) Int. Cl.
*G11B 27/036*     (2006.01)
*H04N 21/414*     (2011.01)
(Continued)

(52) U.S. Cl.
CPC .............. *G11B 27/036* (2013.01); *G06T 1/60* (2013.01); *G06T 11/001* (2013.01); *G06T 11/60* (2013.01);
(Continued)

(58) Field of Classification Search
CPC ......... G06T 11/001; G06T 11/60; G06T 1/60; G09G 2310/08; G09G 5/34; G11B 27/036;
(Continued)

(56) References Cited

U.S. PATENT DOCUMENTS 5,559,949 A *   9/1996   Reimer ............. G06F 17/30017
                                            348/E7.071
7,079,160 B2 *  7/2006   Colavin .................... G09G 5/34
                                            345/564

(Continued)

FOREIGN PATENT DOCUMENTS

| RU | 2009138334 A | 4/2011 |
| RU | 2010146079 A | 5/2012 |
| WO | 2008004189 A2 | 1/2008 |

OTHER PUBLICATIONS

Extended European Search Report for corresponding European Application No. 13157138.2, dated Aug. 6, 2013.
(Continued)

*Primary Examiner* — Thai Tran
*Assistant Examiner* — Stephen Smith
(74) *Attorney, Agent, or Firm* — Workman Nydegger

(57) ABSTRACT

A system for visualizing data includes storage means, and a video source arranged for dividing first data to be visualized in one or more banner areas in a plurality of chunks and arranged for outputting the plurality of chunks of the first data to be displayed and for outputting second data to be visualized as a background. A display for visualizing the first and second data is adapted for having information scrolling in the banner areas of the display. A scroll engine is arranged for receiving the first and second data from the video source, and for grabbing chunks of the first data of the plurality of chunks and for storing the grabbed chunks in the storage means. The scroll engine comprises multiplexing means for (Continued)

multiplexing the second data with stored chunks of the first data, and is arranged for forwarding the multiplexed first and second data to the display.

15 Claims, 4 Drawing Sheets

(51) Int. Cl.
| | |
|---|---|
| H04N 21/426 | (2011.01) |
| H04N 21/488 | (2011.01) |
| G06T 1/60 | (2006.01) |
| G06T 11/00 | (2006.01) |
| G06T 11/60 | (2006.01) |
| G09G 5/34 | (2006.01) |
| G11B 27/19 | (2006.01) |

(52) U.S. Cl.
CPC .............. *G09G 5/34* (2013.01); *G11B 27/19* (2013.01); *H04N 21/41422* (2013.01); *H04N 21/42653* (2013.01); *H04N 21/4886* (2013.01); *G09G 2310/08* (2013.01)

(58) Field of Classification Search
CPC ............. G11B 27/19; H04N 21/41422; H04N 21/42653; H04N 21/4886
USPC ......... 386/241, 137; 715/774; 348/461, 464, 348/468, 564; 345/28, 686, 531
See application file for complete search history.

(56) References Cited

U.S. PATENT DOCUMENTS

| | | | |
|---|---|---|---|
| 7,774,815 B1 | 8/2010 | Allen | |
| 8,019,271 B1* | 9/2011 | Izdepski | H04H 20/57 |
| | | | 455/3.01 |
| 8,176,434 B2 | 5/2012 | Saul et al. | |
| 8,629,939 B1* | 1/2014 | Freund | H04N 5/145 |
| | | | 348/468 |
| 8,695,048 B1* | 4/2014 | Kellicker | H04N 21/47202 |
| | | | 348/468 |
| 2002/0059594 A1 | 5/2002 | Rasmussen et al. | |
| 2002/0135585 A1* | 9/2002 | Dye | G06T 1/60 |
| | | | 345/531 |
| 2003/0227565 A1* | 12/2003 | Hamilton | G09G 5/346 |
| | | | 348/468 |
| 2004/0003406 A1 | 1/2004 | Billmaier | |
| 2006/0239501 A1* | 10/2006 | Petrovic | G06T 1/0028 |
| | | | 382/100 |
| 2008/0052742 A1 | 2/2008 | Kopf et al. | |
| 2008/0129864 A1* | 6/2008 | Stone | H04N 7/0885 |
| | | | 348/468 |
| 2008/0263472 A1 | 10/2008 | Thukral et al. | |
| 2009/0282359 A1 | 11/2009 | Saul et al. | |
| 2009/0310020 A1* | 12/2009 | Vrijsen | H04N 5/4401 |
| | | | 348/564 |
| 2010/0118189 A1* | 5/2010 | Ayoub | G06F 17/289 |
| | | | 348/468 |
| 2012/0176540 A1* | 7/2012 | Labrozzi | H04N 21/4312 |
| | | | 348/468 |
| 2012/0226976 A1* | 9/2012 | Wolter | G06F 3/0485 |
| | | | 715/273 |
| 2012/0321273 A1* | 12/2012 | Messmer | G11B 27/031 |
| | | | 386/224 |
| 2012/0324342 A1* | 12/2012 | Donley | G06F 17/248 |
| | | | 715/246 |
| 2013/0308699 A1* | 11/2013 | Musser, Jr. | H04N 19/85 |
| | | | 375/240.03 |

OTHER PUBLICATIONS

International Search Report for corresponding International PCT Application No. PCT/EP2014/053969, dated Jun. 6, 2014.
Russian Office Action From RU Application No. 2015140694107, May 17, 2017.
"The Plug-in of Smooth Scrolling in Firefox, Yet Another Smooth Scrolling", Downloaded from the Internet from, https://web.archive.org/web/20110528202737/http:/sonikelf.ru:80/plagin-plavnoj-prokrutki-v-firefox-yet-another-smooth-scrolling/#more-4371, May 28, 2015, 14 Pages.

* cited by examiner

SYSTEM FOR VISUALIZING DATA

FIELD OF THE INVENTION

The present invention is generally related to the field of passenger information systems for use in transportation vehicles, airports, railway stations and the like.

BACKGROUND OF THE INVENTION

In the field of passenger information systems more and more high resolution screens are being installed on board of trains, trams and light rail vehicles. These panels are replacing lower resolution matrix displays, e.g. LED displays. This trend is facilitated by the increased robustness of these high resolution panels. In addition, these visualization devices are now available in different sizes. This eases the integration in the passenger area of rail vehicles. Another enabler for this tendency is the fact that embedded processors have become much more powerful and that they are now capable to drive these high resolution output devices.

The main advantage is that these high resolution displays (implemented as e.g. plasma or TFT screens) are capable of communicating more information in an accessible way to passengers compared to other, older communication means.

The basic set-up of such a system is depicted in FIG. 1. A video source (100) renders the data to be visualized on the display (200) using a video link (105). In an advantageous implementation the video source is an (embedded) processor. Other possible implementations can be in FPGA, Video Integrated Circuit, Application Specific Integrated Circuit or by means of other digital video sources. In the majority of applications, the video source (100) is connected by means of one or more communication channels to an on board network (700). Via this network context data and/or data to be visualized are pushed towards the visualization engine (100). The number of tasks to be fulfilled by this video source is typically substantial. A non-exhaustive list includes rendering of templates, decoding JPEG images, decoding of high resolution movie streams, layering, font rendering and handling of network communication. These tasks increase the processor load extensively.

Some information to be shown will scroll over a certain area of the display. The primary advantage of scrolling particular data is the ability to display a larger amount of information than when stationary data is used. As the data moves across a limited space, more information can be displayed and a constantly changing message is presented to readers. Another advantage of scrolling information is that it is more attention-grabbing than stationary data.

The data referred to is not restricted to plain text only (e.g. announcing the next stations on a certain route), but can be various kinds of visual data (e.g. a logo, picture, icon, . . . ).

In addition, some applications require several areas that scroll data, referred to as scrolling banners in the remainder of this description.

In order to implement a smooth scrolling banner the following process is required. At first, the video source needs to render the data to be scrolled within the banner area. This can include font rendering, picture drawing, and so forth. As soon this is finished, in a second phase this data is copied or moved to the memory of the device in charge of the scrolling. This can be the render engine itself or an external device. In a last, third stage the device needs to correctly start the scrolling and ensure that the movement is as smooth as possible over time.

However, some technical difficulties arise when one wants to take into account these three steps in order to realise smooth scrolling banner(s) on the visualization area while at the same time keeping the processor load at an acceptable level. In FIG. 2 different frames are being depicted to be visualized on the screen. In typical applications every frame is visualized for approximately 16 ms. This time interval is referred to as the period of the display's frame rate. In FIG. 2 frame j might, for example, visualize some movie or other graphics (711). Frame j+1 is completely different and includes a banner area (712). The banner should not be visualized in the preceding frame j. The information scrolls until frame n and the banner should disappear immediately in frame n+1. Therefore, synchronization between the visualization of the banner area and the rest of the screen should be handled on frame level. The arrow (900) in FIG. 3 visualizes the direction wherein the data to be visualized should move.

In addition, to allow the second phase in the process to implement smooth scrolling, the video source should have access to a high bandwidth communication channel (124) to allow copying the area to be scrolled over time to storage means (800) of the scrolling device as depicted in FIG. 4. Providing such a high bandwidth communication channel (124), however, involves an additional cost and requires additional processor power.

Beside the capability to allow transparent scrolling (i.e. scrolling whereby data content is overlaid on top of other data content, which also remains at least partially visible), as depicted in FIG. 3, it is an absolute requirement to ensure a consistent smooth movement of the data over the screen per time. No hiccups (i.e. halting of movement during a short or longer period of time) are tolerated. The number of pixels moved per frame must therefore be kept constant at all times.

In the art solutions are known for embedded hardware acceleration in microprocessors. However, absolute smooth scrolling (defined as a consistent movement of data in a certain direction per frame) is not feasible with current solutions. These high end processors cannot be applied in applications where limited heat and power dissipation is required.

In WO2008/004189 a method is disclosed of transmitting a TV signal including an information ticker. A ticker refers to a scrolling display wherein new data or information appears and enters a display area at one end of the display screen (typically, the right hand side) and scrolls across the display screen to the opposite end (typically the left hand side) where it departs the screen. Examples of tickers include news tickers, stoke quote tickers and so on. The proposed solution overcomes the limitations of known ticker solutions that do not offer any flexibility in dealing with the ticker data on the user side. According to the disclosure of WO2008/004189 first ticker data is embedded in a video stream and second ticker data in a separate data stream. The video stream and separate data stream are next multiplexed and broadcasted in a television signal. The proposed solution allows the end user, i.e. the TV viewer, to deal with the ticker data in a flexible way.

Hence, there is a need for a solution wherein the above-mentioned problems are overcome.

SUMMARY OF THE INVENTION

It is an object of embodiments of the present invention to provide for a system that allows smooth scrolling of data content over an information display. More in particular, a system is needed wherein scrolling is performed synchronously with the display's refresh rate. It is a further object of the invention to present a system wherein the appearance and disappearance of data content in information banners is performed at deterministic time instants with frame level accuracy.

The above objective is accomplished by the solution according to the present invention.

In a first aspect the invention relates to a system for visualizing data comprising a video source arranged for dividing first data to be visualized in one or more banner areas in a plurality of chunks and arranged for outputting said plurality of chunks of the first data to be displayed and for outputting second data to be visualized as a background whereon the first data is overlaid. The system comprises a display for visualizing the first and second data, said display being adapted for having information scrolling over one or more dedicated regions of the display. The system further comprises storage means for storing at least a part of the plurality of chunks of first data, and a scroll engine arranged for receiving the first and second data from the video source and arranged for grabbing chunks of the first data of the plurality of chunks and for storing the grabbed chunks in the storage means, said scroll engine comprising multiplexing means for multiplexing the second data from the video source with chunks of the first data stored in the storage means, said scroll engine arranged for forwarding the multiplexed first and second data to the display, where the chunks of the first data are shown scrolling in a banner in the one or more regions dedicated for the scrolling banner overlaid on the second data.

By providing the scroll engine as described the load on the video source can be substantially reduced. The video source divides the data to be displayed in a banner on the display into various chunks. The need for an additional high bandwidth communication channel between video source and memory is eliminated, since the scroll engine grabs data from the video source output and copies it in the storage means. The scroll engine is capable of multiplexing chunks of data for the banner area(s) stored in the memory and second data from the video source, said second data to be visualized outside the one or more banner areas as a background. The multiplexed data is then forwarded to the display, where the chunks of the first data are shown scrolling in a banner in the one or more banner areas overlaid on the second data.

In a most preferred embodiment the video source is adapted to add a marker to at least one chunk of the chunks of first data, whereby said marker at least comprises synchronization information.

Providing various data chunks with a marker, e.g. in the form of a marker line, is highly advantageous in that it allows for synchronous operation on frame level. When the scroll engine receives a chunk of first data and detects a marker line, information for achieving synchronisation becomes available.

In an advantageous embodiment the marker is contained in a set of pixels of the chunks of first data. In a preferred embodiment the colour of the pixels is indicative of the information contained in the pixels.

Advantageously, the marker comprises a header, a payload and a checksum. The payload comprises preferably at least one of the following elements: chunk width, chunk identification, coordinates of a part of said display where first data is to be displayed, timing information.

In a preferred embodiment the scroll engine comprises control logic arranged for processing the markers in the chunks of first data. The control logic is advantageously arranged for performing on the chunks of first data stored in the storage means a shift over a fixed number of pixels per frame.

In another embodiment the scroll engine comprises a memory controller for controlling reading from and writing to the storage means. Preferably, the memory controller can be activated for writing on detection of a marker in order to store the chunks of first data.

Preferably the multiplexing means is arranged for calculating the multiplexed data on a pixel-by-pixel basis.

In a particular embodiment the storage means is integrated in the scroll engine.

In one aspect the invention relates to a passenger information system comprising a system for visualizing data as previously described.

In a further aspect the invention also relates to a method for visualizing first data in a banner on a display overlaid on second data, comprising the steps of rendering in a video source the first and second data to be visualized, dividing in the video source the first data to be visualized in one or more banner areas in a plurality of chunks of the first data, grabbing chunks of the first data of the plurality of chunks received from the video source and storing the grabbed chunks, multiplexing the second data received from the video source and to be visualized as a background, with stored chunks of the first data, and forwarding the multiplexed first and second data to the display, where the chunks of the first data are shown scrolling in a banner in the one or more banner areas overlaid on the second data.

Most preferably the method comprises a step of adding a marker to a chunk of said plurality of chunks of first data, said marker at least comprising synchronization information.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
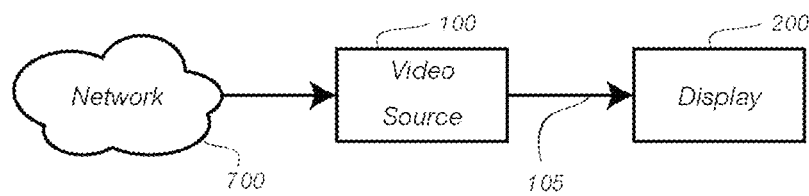
FIG. 1 illustrates a conventional system for displaying video content as applied in passenger information systems.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention presents a system for visualising text and image content wherein an additional component is provided. On top of the parts already shown in the prior art system of FIG. 1, the system comprises a scroll engine to handle scrolling of said data or text content in dedicated regions on the display. Further, an additional feature has been implemented in the video source, which gives the video source the capability of adding a marker to a chunk of data to be displayed in a banner, whereby synchronisation information is comprised in said marker.

Figure 5:
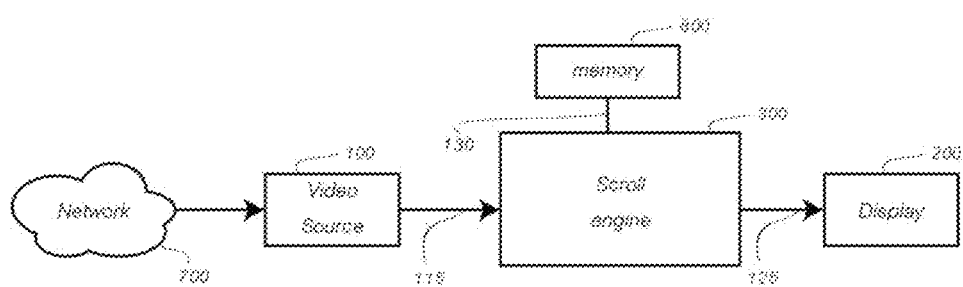
FIG. 5 represents an embodiment of the solution according to the invention.

FIG. 5 illustrates this newly added component (300) together with an adapted video source (100) and the display (200). The scroll engine (300) has access to RAM memory (800) to store data to be visualized by means of an interface (130). This memory can be externally connected or can be implemented within the scroll engine itself.

Figure 6:
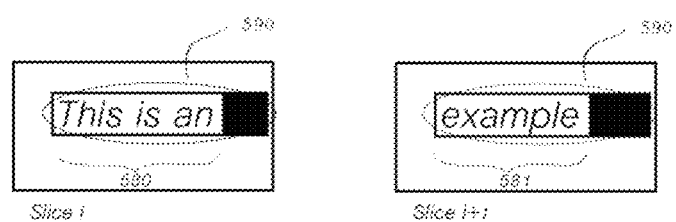
FIG. 6 illustrates two chunks of data in a banner area.

On the side of the video source (100), the data to be visualized into the banner area is divided in different chunks, also referred to as slices, to be displayed sequentially on the display. In terms of number of pixels, a slice is always smaller than or exactly as large as the banner area. In FIG. 6 two slices are depicted. Slice 580, holding the characters 'This is an', is followed by slice 581 containing 'example'. Both slices fit within the banner area (590) wherein the actual scrolling will take place.

Figure 7:
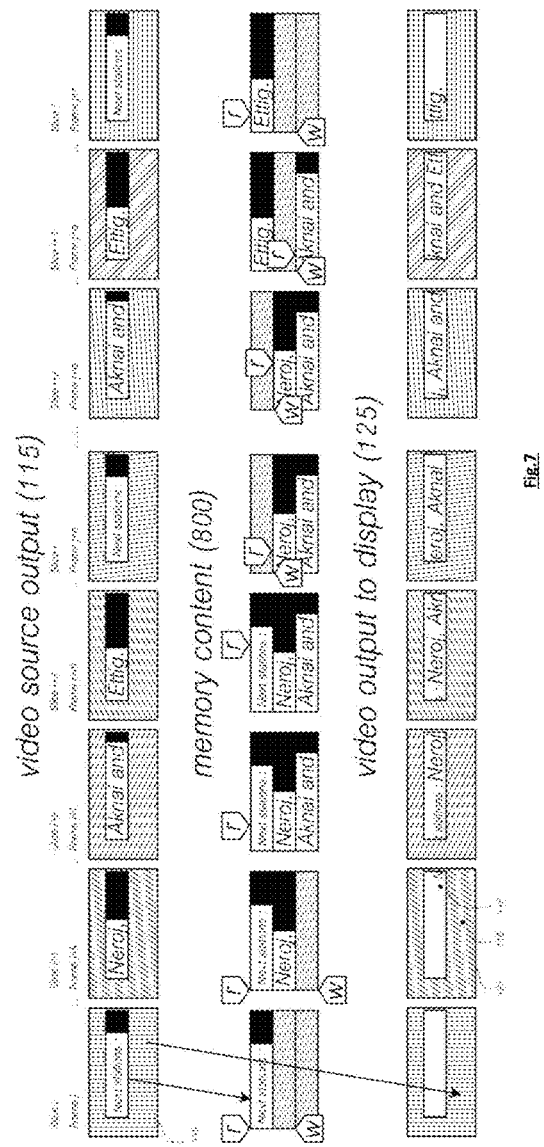
FIG. 7 illustrates the described grabbing and multiplexing mechanisms in an example.

The described process is depicted in FIG. 7 with an example. The first row represents the different frames j to frame j+r of the video source output (115). The area not including the banner area may alter in each frame (e.g. displaying a video) and is directly forwarded to the scroll engine output (125). This is handled by the multiplexing device (310).

Within the scroll engine the scroll engine is capable of grabbing data directly from the video source output (115). Therefore the need for an additional high bandwidth communication channel to connect the video source with the memory is avoided. In frame j the first slice i is copied by the scroll engine into the first memory location as depicted in the second row of FIG. 7.

In frame j the scroll engine outputs the data (115) received at the scroll engine input multiplexed with a banner area overlay. As soon as enough slices are received and stored into the storage means, the scroll engine starts multiplexing the input data (115) with the stored content in memory (800). This is depicted in the third row of FIG. 7, frame j+k. Each time the output frame (125) is refreshed, the read pointer (indicated with marker r in FIG. 7) pointing to the location of the memory wherefrom data is read, is incremented with a constant value according to the scroll speed in order to achieve smooth scrolling.

As soon as the memory is completely filled with chunks of data, the grabbing process is halted until memory can be freed. This happens when a slice has been completely visualized, as is the case for slice i at frame j+n (FIG. 7). At this time memory is freed instantly and as soon as the video source again outputs a next slice to be stored, the scroll engine grabs and stores said chunk. This is depicted in frame j+q.

Figure 8:
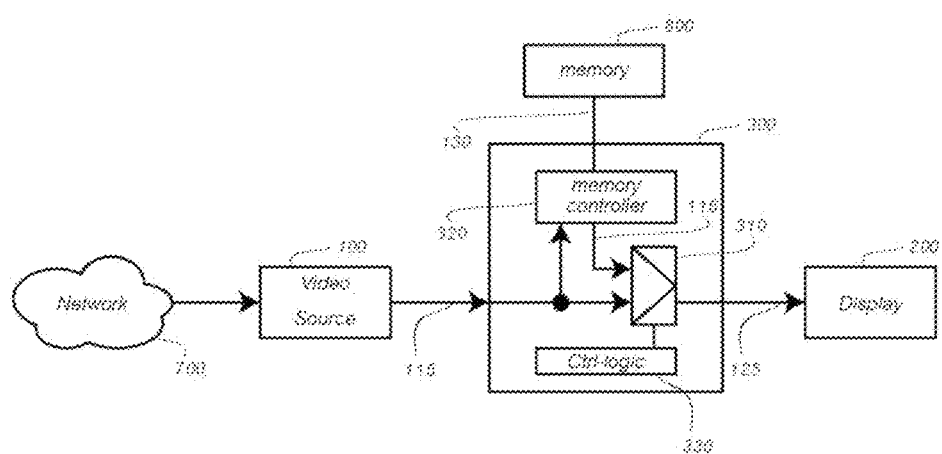
FIG. 8 represents a more detailed view on an embodiment of the scroll engine.

In the embodiment in FIG. 8 three main components can be identified within the scroll engine:

a memory controller (320) to allow reading from and writing to the memory repository (800).

a multiplexer (310) which calculates—on a pixel basis—the output value, taking into account banner information stored in the memory, video source output (115) and other parameters (e.g. alpha value giving a measure (typically between 0 and 1) for transparency, e.g. alpha=0 is completely invisible and alpha=1 is completely visible) and the control logic (330) which takes care of the algorithm described more in detail below.

Figure 2:
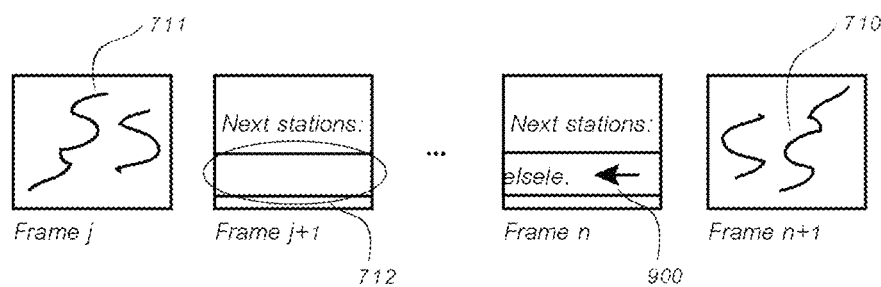
FIG. 2 illustrates different frames to be visualized on a display.
Figure 3:
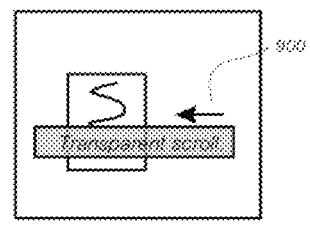
FIG. 3 illustrates transparent scrolling.
Figure 4:
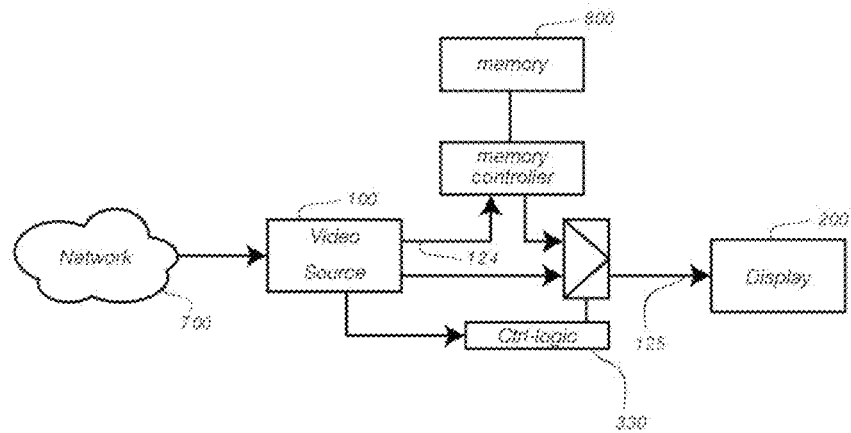
FIG. 4 represents a conventional system with dedicated high bandwidth communication channel to access storage means.

To allow synchronization on frame level, as depicted in FIG. 2, the video source (100) is according to this invention adapted to add to the video stream (115) information referred to as marker lines.

Figure 9:
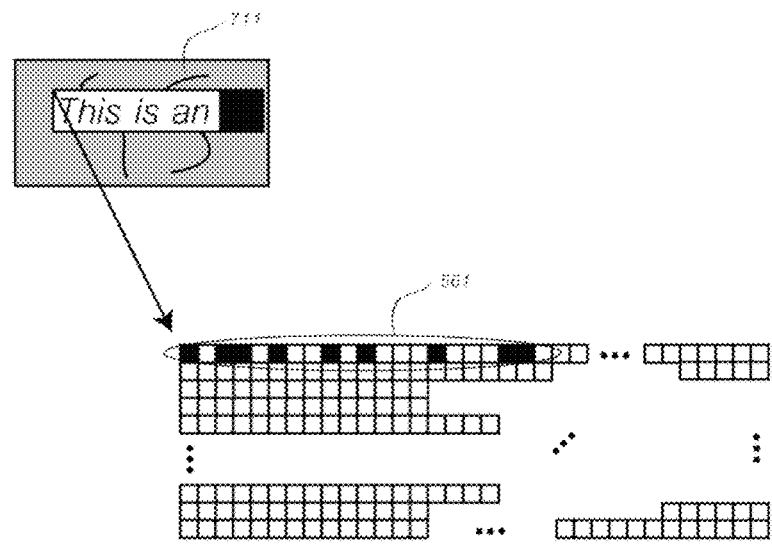
FIG. 9 illustrates a marker line in a slice of data.

FIG. 9 depicts a banner area and in it a slice (580). In the embodiment shown in the figure the pixels (561) of this slice area hold data which will be processed by the scroll engine. Details on the data are provided below. In this way exact synchronization is achieved and data required for correct scrolling and visualisation on the display can be communicated between video source (100) and scroll engine component (330) without the need of an additional communication channel.

The marker line comprises pixels which hold data by means of the colour of these pixels. For example, in a 6*3 bit per pixel system (e.g. an RGB system), each pixel can hold 18 bit of information. The marker line comprises three main fields:

1/ a marker line header, which can serve as an 'eye catcher', so that the arrival of a marker line can easily be detected by the control logic, 2/ the payload carrying the data to be processed by the scroll engine and 3/ a checksum, which is calculated taking into account the previous fields. The latter has been implemented to reduce the risk of a random sequence of pixels (e.g. within a movie) being interpreted incorrectly as a marker line whereby the scrolling process is triggered incorrectly.

In an advantageous embodiment the marker line may be configured as follows. The header part comprises an eye catcher, which is a consecutive number of pixels holding specific colours to ease the localization of the marker line within the data stream (115) by the scroll engine (300). The pay load includes at least one or more of:

marker line version the background colour of the banner the text colour of the slices specific commands (examples are: scroller reset, scroller enable)

number of banner areas scroll direction slice identification transparency value banner coordinates (both to grab and to display)

slice width timing (scroll speed)

Further, a checksum can be provided.

The requirement of smooth scrolling without hiccups can be met by shifting data a fixed number of pixels per frame. If this number varies over time, the scrolling is not perceived as smooth. However, implementing this feature in the video source would impose an undue computational burden on the video source. Therefore, in the present invention a realisation in hardware exploiting a scroll engine is proposed. The scroll engine of this invention complies with this requirement of smooth scrolling. It is noted that scrolling can be performed in any direction, i.e. from left to right, from right to left, from bottom to top, from top to bottom or any meaningful combination thereof.

The algorithm execution is supervised by the control logic (330) of the scroll engine (300) and comprises a number of consecutive steps. The video input data is checked by the control logic on the existence of one or more marker lines. If none exists, the video output (125) is equal to the input video stream (115). If a marker line is detected, the control logic parses the required data from its payload. If the banner should not be transparent, the scroll engine lays an overlay over the banner area, using the background colour fetched from the marker line information. At that moment the slice data is not visualized any longer on the display (125), but remains available for the scroll engine. An example is depicted in FIG. 7, row three, frame j. In the case of transparent banners, data is grabbed from a non-visible part of the display.

As soon as one or more marker lines are detected, the scroll engine grabs the slices one by one and stores them in the available memory. The write pointer (indicated with marker w in FIG. 7) points to the next available memory space. If the memory is almost full, the storage will be halted until data has been freed because it has been 'shifted' out of the visualization area and is not needed any longer.

Figure 10:
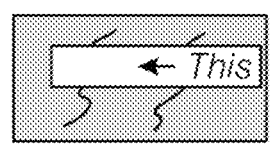
FIG. 10 represents a banner scrolling in the indicated direction.

As soon as one full slice is available in the memory, the scrolling can start. In FIG. 10 the scrolling has actually started and the first characters of the complete sentence "This is an example" are being visualized.

As soon as a certain marker line is no longer present in the input stream, the control logic immediately removes the banner area(s). In this way, synchronization is achieved on frame level.

In certain embodiments more than one banner can be applied on a display. In that particular case each banner can be treated separately as previously described. For example, data for each banner are separately chunked in slices smaller than or equal to the banner area and provided with marker lines etc. Also the scroll speed can differ between two or more instances.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system for visualizing data comprising
    a video source arranged for dividing first data to be visualized in one or more banner areas in a plurality of chunks, arranged for rendering said first data and for rendering second data to be visualized as a background and arranged for outputting said plurality of chunks of said first data to be displayed and for outputting said second data to be visualized as a background,
    a display for visualizing said first and second data, said display being adapted for having information scrolling in said one or more banner areas of the display,
said system further comprising
    storage means for storing said first data, and
    a scroll engine arranged for receiving said first and said second data from said video source and arranged for grabbing chunks of said first data of said plurality of chunks and for storing said grabbed chunks in said storage means, said scroll engine comprising multiplexing means for multiplexing, once enough chunks of said first data have been stored in said storage means, said second data with stored chunks of said first data from said storage means, said scroll engine arranged for forwarding said multiplexed first and second data to said display, where the chunks of said first data are shown scrolling in a banner in said one or more banner areas overlaid on said second data, said scroll engine further comprising a read pointer for pointing to a location in said storage means wherefrom said first data is read, said read pointer being incrementable with a constant value according to a scroll speed so that smooth scrolling is obtained.

2. The system for visualizing data as in claim 1, wherein said video source is adapted to add a marker to a chunk of said plurality of chunks of first data, said marker at least comprising synchronization information.

3. The system for visualizing data as in claim 2, wherein said marker is contained in a set of pixels of said chunks of first data.

4. The system for visualizing data as in claim 3, wherein the colour of said pixels is indicative of the information contained in said pixels.

5. The system for visualizing data as in claim 3, wherein said marker comprises a header, a payload and a checksum.

6. The system for visualizing data as in claim 5, wherein said payload comprises at least one of the following elements: chunk width, chunk identification, coordinates of a part of said display where first data is to be displayed, timing information.

7. The system for visualizing data as in claim 2, wherein said scroll engine comprises control logic arranged for processing said markers in said chunks.

8. The system for visualizing data as in claim 7, wherein said control logic is arranged for performing on said chunks of first data stored in said storage means a shift over a fixed number of pixels per frame.

9. The system for visualizing data as in claim 1, wherein said scroll engine comprises a memory controller for controlling reading from and writing to said storage means.

10. The system for visualizing data as in claim 9, wherein said memory controller can be activated for writing on detection of a marker.

11. The system for visualizing data as in claim 1, wherein said multiplexing means is arranged for calculating said multiplexed data on a pixel-by-pixel basis.

12. The system for visualizing data as in claim 1, wherein said storage means is integrated in said scroll engine.

13. A passenger information system comprising a system for visualizing data as in claim 1.

14. A method for visualizing first data in a banner on a display overlaid on second data, comprising the steps of
    rendering in a video source said first and second data to be visualized,
    dividing in said video source said first data to be visualized in one or more banner areas in a plurality of chunks of said first data,
    grabbing chunks of said first data of said plurality of chunks received from said video source and storing said grabbed chunks in a storage means,
    multiplexing, once enough chunks of said first data have been stored, said second data received from said video source and to be visualized as a background, with stored chunks of said first data, and
    forwarding said multiplexed first and second data to said display, where the chunks of said first data are shown scrolling in a banner in said one or more banner areas overlaid on said second data, whereby each time an output frame is refreshed, a read pointer to a location in said storage means wherefrom said first data is read, is incremented with a constant value according to a scroll speed, so that smooth scrolling is obtained.

15. The method for visualizing data as in claim 14, comprising adding a marker to a chunk of said plurality of chunks of first data, said marker at least comprising synchronization information.

* * * * *